Aug. 12, 1930.   G. V. JEFFERSON   1,772,810
LIGHT SIGNAL
Filed July 11, 1929   2 Sheets-Sheet 1

INVENTOR:
G. V. Jefferson,
by A. R. Vencill.
His Attorney

Aug. 12, 1930.  G. V. JEFFERSON  1,772,810
LIGHT SIGNAL
Filed July 11, 1929  2 Sheets-Sheet 2

INVENTOR:
G. V. Jefferson,
by A. R. Vincill.
His Attorney

Patented Aug. 12, 1930

1,772,810

UNITED STATES PATENT OFFICE

GLENN V. JEFFERSON, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

LIGHT SIGNAL

Application filed July 11, 1929. Serial No. 377,513.

My invention relates to light signals.

I will describe two forms of light signals embodying my invention, and will then point out the novel features thereof in claims.

Figure 1:
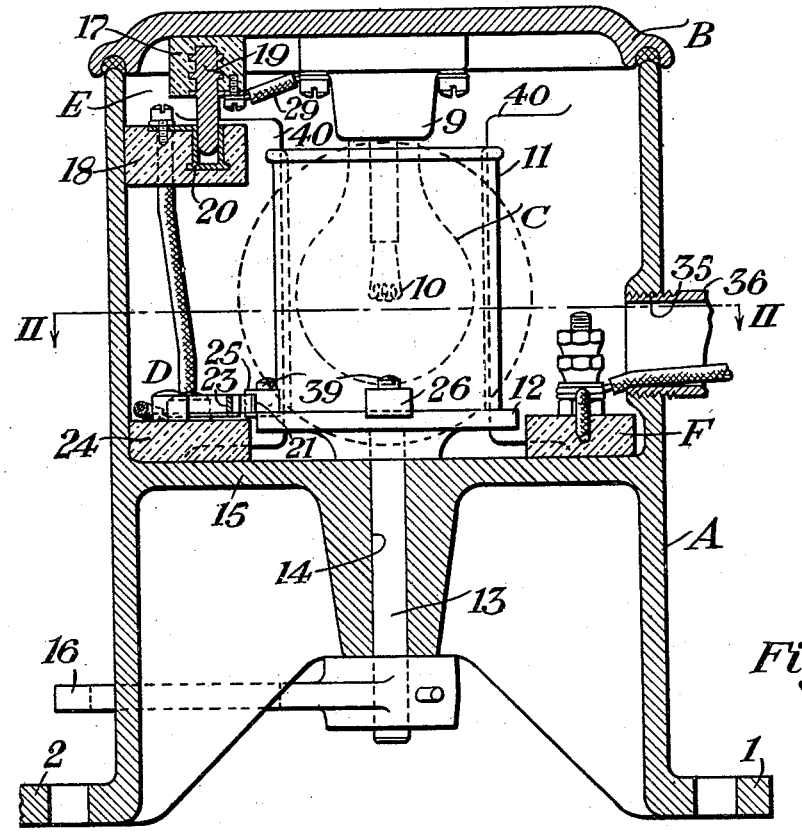
Figure 2:
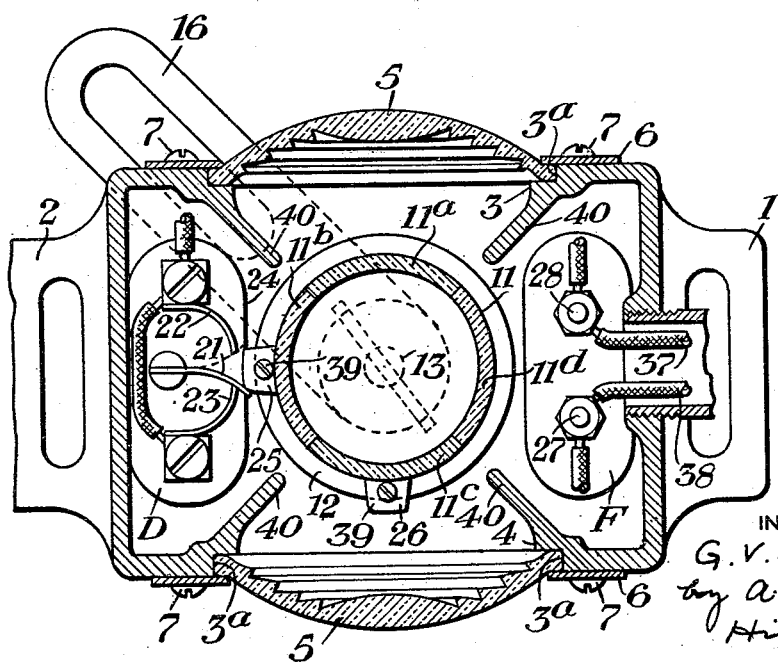
Figure 3:
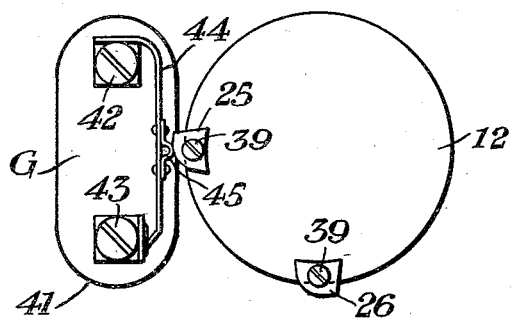
Figure 4:
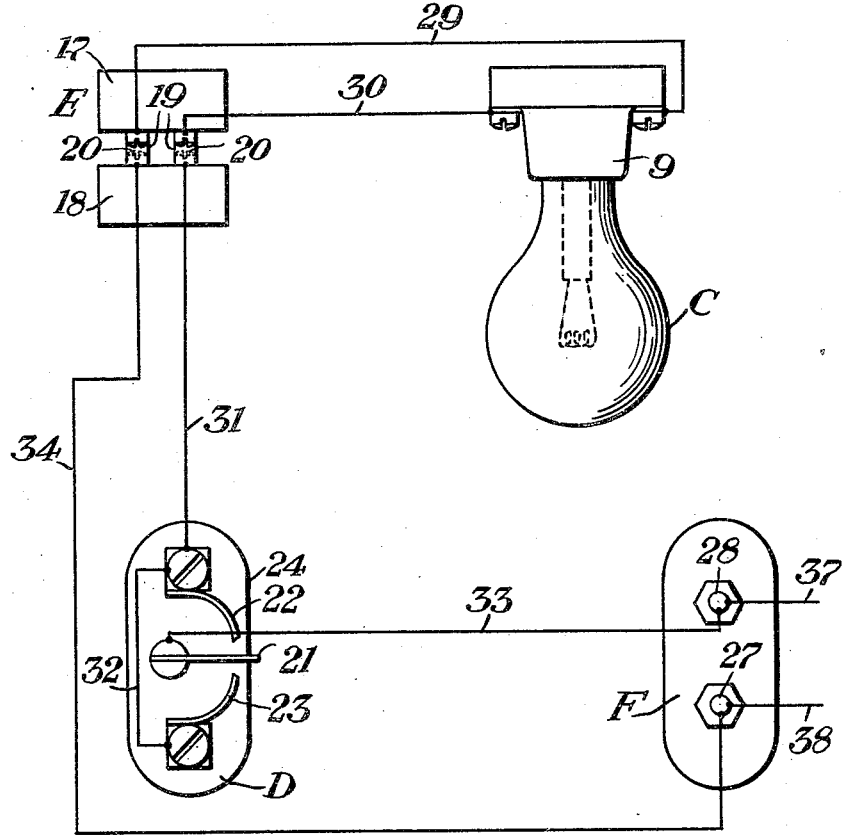

In the accompanying drawings, Fig. 1 is a vertical sectional view showing one form of light signal embodying my invention. Fig. 2 is a sectional view on the line II—II of Fig. 1. Fig. 3 is a detail view showing a modified form of a portion of the light signal shown in Figs. 1 and 2, and also embodying my invention. Fig. 4 is a view, partially diagrammatic, showing the electrical connections on the interior of the light signal shown in Figs. 1 and 2.

Similar reference characters refer to similar parts in each of the several views.

Referring first to Figs. 1 and 2, the light signal comprises a suitable housing or casing A, which, in the form here shown, is rectangular in shape. The top of the casing A is provided with a removable cover B to permit convenient access to the interior of the casing, and the bottom of the casing is provided with two integral outwardly projecting lugs 1 and 2 by means of which the signal may be adjustably attached to a suitable support.

As best seen in Fig. 2, two opposite side walls of the casing A are provided with aligned holes 3 and 4, each of which is covered by a lens 5, here shown as an echelon lens. Each lens 5 fits in an annular groove 3ª and is fastened in place by a ring 6 attached to the casing A by means of screws 7. If desired, the usual hood (not shown) may be attached to the casing over each lens 7 to protect the lenses from snow and from the direct rays of the sun.

Within the casing A is a source of light here shown as an incandescent lamp C. The lamp C is mounted in a socket 9 fastened to the cover B. The socket 9 is so positioned that when the cover B is fastened in place, the filament 10 of the lamp C will be located at the focal point of both lenses 5. It will thus be apparent that a beam of substantially parallel rays is projected from each lens 5 when the lamp C is lighted.

Means are provided for imparting a distinctive color to the beams of light projected by the lenses 5. For this purpose, a partition 15 in the casing A is provided with a vertically extending hole 14, in which is journalled a rockshaft 13. The upper end of the rockshaft 13 carries a table 12, and the lower end is provided with an adjustable operating crank 16 by means of which the rockshaft 13, and hence the table 12, may be rotated. Mounted on the table 12, and surrounding the lamp C, is a translucent screen 11 comprising a plurality of segments each having a distinctive color. As here shown, the screen 11 comprises four segments designated 11ª, 11ᵇ, 11ᶜ and 11ᵈ, two of which 11ª and 11ᶜ are of one color and are diametrically opposite, while the remaining two 11ᵇ and 11ᵈ are similarly disposed but have a different color. For example, the segments 11ª and 11ᶜ may be green, while the segments 11ᵇ and 11ᵈ may be red. The position of the screen 11 on the table 12 is such that, when the crank 16 is at one end of its stroke, the segments 11ª and 11ᶜ are interposed one between the filament 10 of the lamp C and each of the lenses 5, as best seen in Fig. 2, but that when the crank is rotated in a clockwise direction through an angle of substantially 90° to the other end of its stroke, the segments 11ᵇ and 11ᵈ of the color screen are then interposed one between the filament 10 of the lamp C and each of the lenses 5.

To prevent light rays of more than one color from being supplied to the lenses 5 when the crank 16 occupies either extreme position, the interior of the casing A is provided with a plurality of integral baffle plates 40. The baffle plates 40 extend radially toward the axis of the screen 11 from the top to the bottom of the screen and are disposed in such manner that the inner end of each baffle plate is adjacent the junction of two segments of different color when the crank 16 is in either extreme position.

The signal also comprises means for controlling the lamp C in such manner that the lamp will not become lighted unless the parts are in the proper position to display the desired color corresponding to the position of operating crank 16. One way in which this desirable result may be accomplished is by means of a circuit controller, one form of which is designated by the reference character D, and is shown in Figs. 1, 2 and 4. The circuit controller D comprises an insulating base 24 carrying a flexible contact finger 21 mounted between two fixed contacts 22 and 23. The flexible contact finger 21 may be moved into engagement with one or the other of the contacts 22 or 23 in a manner presently to be described.

The reference character E designates a jack which, in the form here shown, comprises two blocks 17 and 18 of insulating material which are fastened respectively to the cover B, and to the side wall of the casing A. The block 17 carries two plug inserts 19, and the block 18 carries two sockets 20, only one plug and one socket being visible in Fig. 1, The parts of the jack E are so disposed that when the cover B is placed on the casing A, the plugs 19 will enter the sockets 20 and make good electrical connection therewith.

The lamp C is connected with two binding posts 27 and 28 of a terminal board F through the jack E and the circuit controller D as indicated diagrammatically in Fig. 4. The terminals of socket 9 are connected directly with the plugs 19 of jack E by means of wires 29 and 30. The one socket 20 of the jack E is connected with contact 22 of circuit controller D by means of a wire 31 and with contact 23 of circuit controller D by means of wires 31 and 32. The other socket 20 of jack E is connected directly with the binding post 27 of terminal board F. The contact finger 21 of circuit controller D is connected with binding post 28 of terminal board F. The binding posts 27 and 28 may be connected with a suitable source of current, not shown in the drawing, by means of leads 37 and 38, which leads are brought into the casing A adjacent the terminal board F through a conduit 36 screwed into a threaded hole 35 in the side wall of the casing (see Figs. 1 and 2). It will thus be apparent that lamp C will not become lighted unless cover B is in the proper position and circuit controller D is operated to close contact 21—22 or 21—23.

Circuit controller D is controlled by two cams 25 and 26 attached to the table 12 by screws 39. The cams 25 and 26 are attached to the table in such positions that, when crank 16 is in one extreme position, so that the green segments 11ª and 11ᶜ are interposed in the beams issuing from the signal, the cam 25 will engage the contact finger 21 of circuit controller D to close contact 21—23; but that when the crank 16 is in the other extreme position, so that the red segments 11ᵇ and 11ᵈ are interposed in the signal beams, the cam 26 will engage the contact finger 21 to close contact 21—22. It will be apparent from an inspection of the drawing, therefore, that lamp L will become lighted when crank 16 occupies either extreme position, but that, when crank 16 occupies an intermediate position, lamp L will remain dark. It follows, therefore, that the signal can project a beam only when the parts are in proper positions to display the desired color corresponding to the position of crank 16.

Referring now to Fig. 3, I have here shown a modified form of circuit controller which is designated by the reference character G and which may be used in place of the circuit controller D shown in Figs. 1, 2 and 4. The circuit controller G comprises an insulating support 41 carrying two terminal posts 42 and 43. Attached to the terminal post 42, and co-acting with the terminal post 43 is a flexible contact finger 44. The contact finger 44 is biased to a position in which the finger is out of engagement with the terminal post 43, but the contact finger may at times be moved into engagement with the terminal post 44, in which position it is illustrated in the drawing, by means of a substantially U-shaped member 45 riveted to the contact finger and adjusted to be engaged by one or the other of the cams 25 or 26. It will be noted that the cams 25 and 26, as shown in Fig. 3, have one corner rounded to permit proper operation of the circuit controller.

Signals embodying my invention are particularly suitable for, although in no way limited to, use in railway signaling systems in connection with a railway switch to indicate whether the switch is normal or reversed, that is, whether the switch is set for traffic to proceed along the main track or to enter or leave a branch track or siding. When used for this purpose the operating crank 16 will be connected with the switch points in such manner that when the switch is normal the operating crank will occupy the extreme position in which it is illustrated in the drawing so that a green indication is displayed by the signal, but that when the switch is reversed, the operating crank will then occupy the other extreme position, and the signal will then display a red indication. By varying the point of connection of the switch with the slotted crank 16, the effective length of this crank may be adjusted to any reasonable value, so that the signal may be adjusted to give the desired angular movement of the screen in response to the stroke of the particular switch with which it is associated.

One advantage of a light signal embodying my invention is that false or incorrect indications are impossible because any light from an external source which passes through the signal must pass through the screen, and the screen always occupies a position corresponding to the condition of the apparatus with which the signal is connected, so that any indication displayed by the signal must correspond with the condition of such apparatus.

Another advantage of a light signal embodying my invention is that if the crank is not operated to one extreme position or the other, the signal will remain dark, thereby indicating the improper operation of the apparatus with which the signal is connected.

A further advantage of a light signal embodying my invention is that the source of light is mounted on the cover and is therefore not subjected to the shocks which might accompany the operation of the signal.

Still another advantage of a light signal embodying my invention is that since connections to the lamp C are made through the jack E, the use of flexible leads is unnecessary and the cover B may be easily removed whenever access to the interior of the signal is desired.

Further advantages of a light signal embodying my invention are that there is only one moving part and the signal is economical to manufacture and dependable in operation.

Although I have herein shown and described only two forms of light signals embodying my invention, it is understood that various changes and modifications may be made therein within the scope of the appended claims without departing from the spirit and scope of my invention.

Having thus described my invention, what I claim is:

1. A light signal comprising an electric lamp, means for projecting two beams of light from said lamp in opposite directions, a rotatable table, a screen mounted on said table and surrounding said lamp for imparting distinctive colors to said beams and comprising two pairs of diametrically opposite segments each pair of which has a different color, a circuit controller comprising a flexible contact finger mounted between two fixed contacts, two cams attached to said table in such manner that one cam will engage said contact finger and close one of said fixed contacts when and only when the segments are located in the proper positions to color said beams one color but that the other cam will engage said contact finger and close the other of said contacts when and only when the segments are located in the proper position to color said beam the other color, and a circuit for said lamp controlled by said circuit controller.

2. A light signal comprising an electric lamp, means for projecting two beams of light from said lamp in opposite directions, a rotatable table, a color screen mounted on said table and surrounding said lamp for imparting distinctive colors to said beams and comprising two pairs of diametrically opposite segments each pair of which has a different color, a circuit controller comprising an insulating support carrying two terminal posts, a flexible contact finger attached to one of said posts and co-acting with the other of said posts and having riveted thereto a substantially U-shaped member, two cams attached to said table in such manner that one cam will engage said U-shaped member to close said circuit controller when and only when the segments are located in the proper position to color said beams one color but that the other cam will engage said U-shaped member when and only when the segments are located in the proper positions to color said beams the other color, and a circuit for said lamp controlled by said circuit controller.

3. A light signal comprising a casing provided with a hole, an electric lamp in said casing, means for projecting a beam of light from said lamp through said hole, a rotatable cylindrical screen in said casing surrounding said lamp for imparting different colors to said beam and comprising a plurality of segments each having a different color, means for rotating said screen, means for lighting said lamp when and only when one of said segments is in the proper position to color said beam, and baffle plates integral with said casing and extending radially toward the axis of said screen from the top to the bottom of the screen in such manner that the inner edge of each baffle plate is adjacent the junction of two of said segments when said screen is in the proper position to color said beam.

4. A light signal comprising a casing provided with a hole and having a removable cover, an electric lamp in said casing attached to said cover, a jack in said casing comprising a first insulating block attached to said cover and carrying two plug inserts, and a second insulating block attached to said casing and carrying two sockets adapted to receive said plug inserts when said cover is in place; means for projecting a beam of light from said lamp through said hole, and a circuit for said lamp including said jack.

5. A light signal comprising a casing provided with a hole and having a removable cover, an electric lamp in said casing attached to said cover, a jack in said casing comprising a first insulating block attached to said cover and carrying two plug inserts, and a second insulating block attached to said casing and carrying two sockets adapted to receive said plug inserts when said cover is in place; means for projecting a beam of light from said lamp through said hole, a color screen interposed in the path of light from said lamp and movable to impart different colors to said beam, a circuit controller responsive to the position of said screen, and a circuit for said lamp controlled by said circuit controller and including said jack.

6. A light signal comprising a casing having an open top, and provided with two aligned holes located in opposite side walls, a cover for the top of said casing, an electric lamp in said casing attached to said cover, means for projecting two beams of light from said lamp one through each of said holes, a partition in said casing provided with a vertically extending hole, a rockshaft journaled in said hole, an operating crank attached to the lower end of said shaft for rotating said shaft, a rotatable table, a cylindrical color screen mounted on said table and surrounding said lamp and comprising two diametrically opposite segments of one color and two other similar segments of a different color, a circuit controller in said casing comprising two fixed contacts and a flexible contact finger which may be bent into engagement with either of said fixed contacts, a first cam attached to said table in a position to engage said finger and bend the finger into engagement with one of said fixed contacts when the segments of one color are in alignment with said aligned holes, a second cam attached to said table in a position to engage said finger and bend the finger into engagement with the other of said fixed contacts when the segments of the other color are in alignment with said aligned holes; a jack comprising a first insulating block attached to said cover and carrying two plug inserts, and a second insulating block attached to said casing and carrying two sockets adapted to receive said plugs when said cover is fastened to said casing, and a circuit for said lamp including said jack and controlled by said circuit controller.

In testimony whereof I affix my signature.

GLENN V. JEFFERSON.